United States Patent Office 3,212,824
Patented Oct. 19, 1965

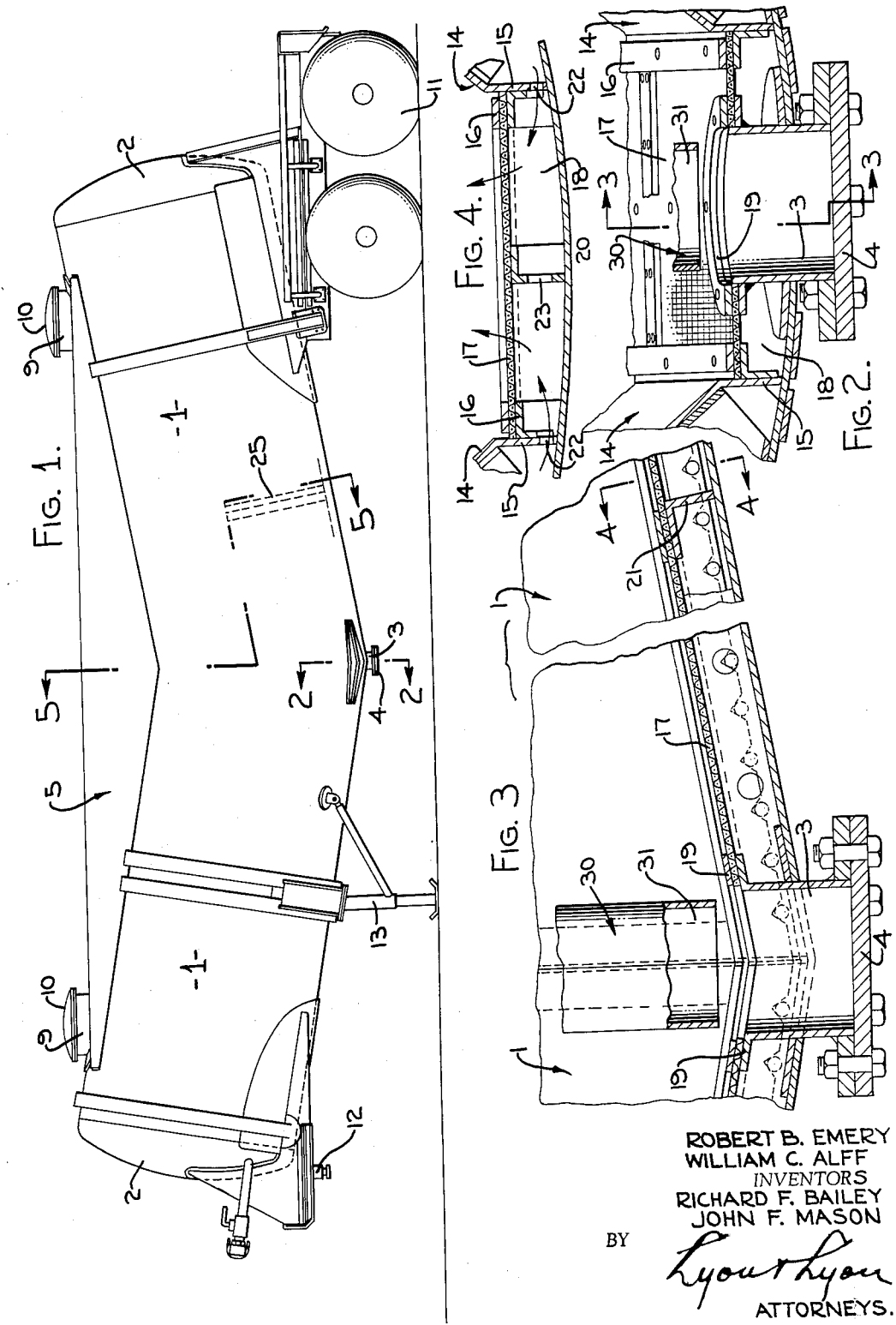

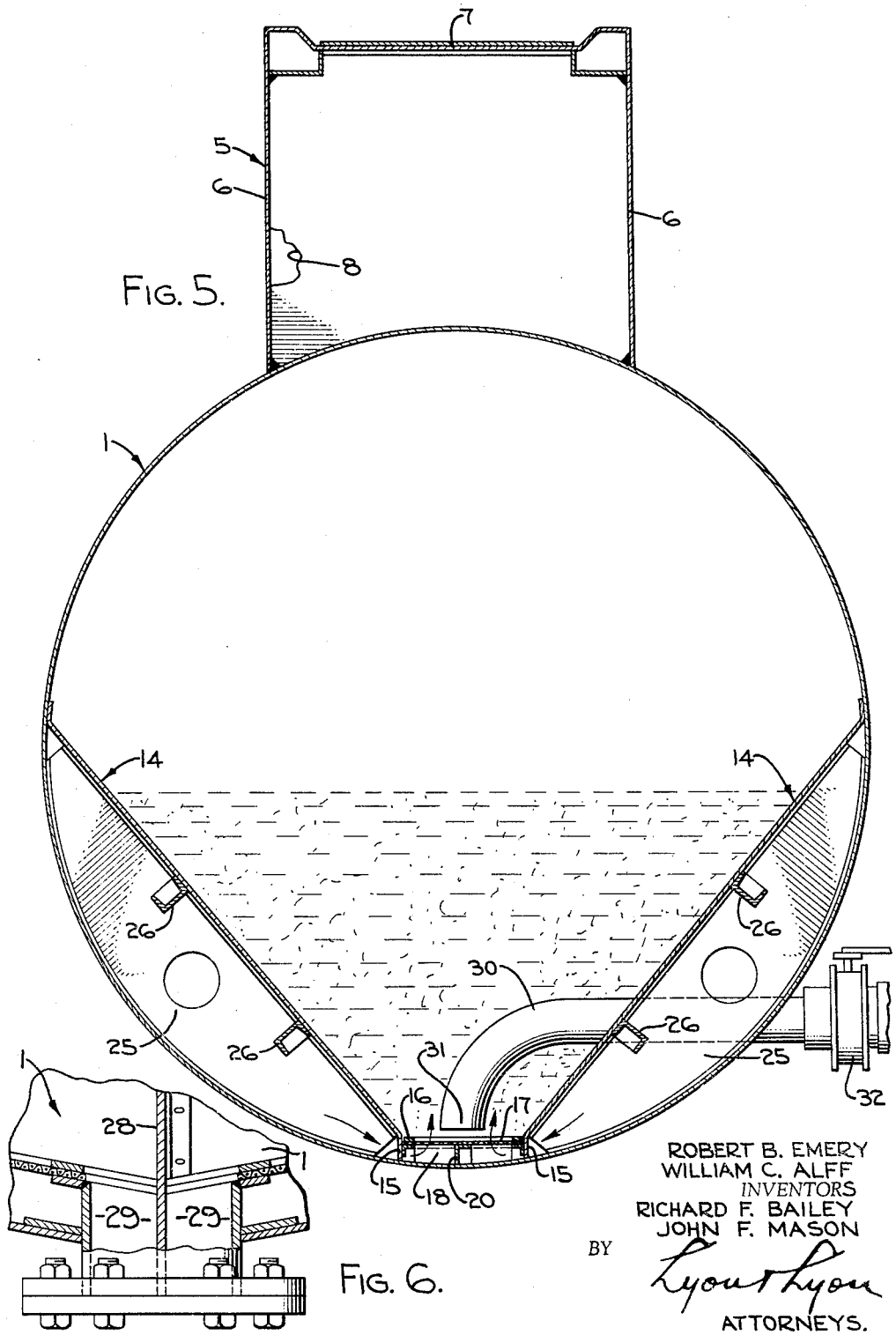

3,212,824
TANK CONSTRUCTION FOR BULK MATERIALS
Robert B. Emery, William C. Alff, Richard F. Bailey, and John F. Mason, Duncan, Okla., assignors to Halliburton Company, Duncan, Okla., a corporation of Delaware
Filed Dec. 27, 1962, Ser. No. 247,728
9 Claims. (Cl. 302—52)

A primary object of this invention is to provide an essentially horizontally extending tank for the storage and transportation of bulk material, wherein two tank substructures slope downwardly toward and are joined to each other at the center of the structure so as to provide a region to receive a discharge pipe for fluidized material and also to form a concave upper side bridged by a reinforcing beam, which supplies a substantial portion of the beam strength necessary to support the load.

A further object is to provide a tank of this construction having air-gravity slide conveyors along its bottom wall and upwardly diverging internal partition walls to ensure lateral flow of bulk material to the slide conveyors, the partition walls also serving to form side chambers for flow of air under the slide conveyors.

A further object is to provide a tank construction for transportation or storage of two different types of bulk material.

With the above and other objects in view as may appear hereinafter, reference is directed to the accompanying drawings in which:

FIGURE 1 is a side view of the tank construction for bulk materials.

FIGURE 2 is an enlarged fragmentary sectional view thereof taken through 2—2 of FIGURE 1 showing particularly the discharge tube.

FIGURE 3 is an enlarged fragmentary sectional view taken through 3—3 of FIGURE 2.

FIGURE 4 is an enlarged fragmentary sectional view taken through 4—4 of FIGURE 3.

FIGURE 5 is an enlarged transverse sectional view taken through 5—5 of FIGURE 1.

FIGURE 6 is a fragmentary side view illustrating a modified form of the tank construction.

The tank construction includes two tank subsections 1. Each tank subsection is in the form of a cylinder of uniform diameter, and the two subsections are joined end-to-end in such a manner that they converge upwardly from each other to define an obtuse angle. The distal ends of the subsections 1 are provided with covers 2. At the apex of the obtuse angle formed by the undersides of the two sections there is provided a downwardly extending sump tube 3, which is provided with a removable cover plate 4.

The upper sides of the subsections 1 form an obtuse reentrant angle, that is, the tank construction formed by the two subsections is concave at its upper side. Bridging across the upper side of the tank structure is a beam 5 comprising side walls 6 welded to the subsections 1 and a horizontal deck 7 joined to the side walls. Transverse partitions 8 are provided to further strengthen the beam. At the extremities of the beam 5, filler tubes 9 are provided which are normally closed by covers 10.

In the construction illustrated, the tank is intended for the hauling of bulk material, and is therefore provided at one end with a wheeled carrier assembly 11. The other or front end is provided with a tractor mounting means 12. Adjacent to the forward end, foldable feet 13 are provided so as to support the tank construction when not secured to a tractor. The wheeled carrier assembly 11, tractor mounting means 12, and foldable feet 13 are, per se, conventional. The wheeled carrier assembly 11 and tractor mounting means 12 comprise support means at the extremities of the tank structure.

Each tank subsection 1 is provided with a pair of downwardly converging partition walls 14. Each partition wall is joined to the wall of the subsection approximately midway between the upper and lower sides thereof, and extends chordwise downwardly and inwardly to the bottom of the subsection at a point offset laterally from the median plane of the subsection.

The bottom margins of the partition walls 14 are bent to form shallow side wall portions 15 which support parallel clamp frames 16 adapted to clamp the margins of a porous membrane 17 which forms a slide conveyor. A plenum chamber 18 is formed under the porous membrane 17 between the wall portions 15. The sump tube 3 extends upwardly through the plenum chamber 18 and is provided with clamp flanges 19 secured to the longitudinally central portion of the porous membrane 17.

A center support 20 is provided under the porous membrane 17, and cross supports 21 are provided under the porous membrane. Ports 22 are provided in the side wall portion 15 and similar ports 23 are provided in the center support 20, so that the plenum chamber 18 is connected to segmental chamber 24 formed behind the partition walls 14. The partition walls 14 are supported at intervals by ribs 25 having ports therein and are also reinforced longitudinally by channel members 26. One or both of the segmental chambers 24 is connected to an air supply line 27, indicated in FIGURE 1, so that air may be supplied to the plenum chamber 18 in each of the tank subsections 1.

A discharge tube 30 extends laterally from the midportion of the tank structure and is provided with a downturned intake end 31 directed into the sump tube 3, as indicated fragmentarily in FIGURES 3 and 4. The outer end of the discharge tube 30 is provided with a valve 32 and conventional means, not shown, for connection to a flow line.

If it is desired to arrange the tank construction so as to carry two separate types of bulk material, the two tank subsections may be separated by a transverse central partition 28 indicated by dotted lines in FIGURE 6. In this case, a pair of sump tubes 29 are provided contiguous to the central partition 28, and a pair of the discharge tubes 30 are utilized.

Bulk material is discharged from the tank structure as follows:

Before opening the discharge valve 32, air under pressure is introduced into the segmental chambers 24. The air flows therefrom into the plenum chamber 18, and upwardly through the bulk material until the entire tank structure is under pressure.

The valve 32 is then opened, whereupon the bulk material fluidized by the air is caused to flow outwardly through the discharge tube 30. As the pressure in the main portion of the tank structure drops, additional air flows from the segmental chambers 24, plenum 18, and porous membrane 17 to maintain the bulk material in a fluid or mobile state.

It is well established that slide conveyors are capable of handling bulk material when inclined at an angle of only 4 degrees. By reason of the fact that the tank construction comprises two subsections which slope downwardly from the ends of the structure to the central portion thereof, a slope substantially greater than 4 degrees may be provided; in fact, in the construction illustrated, a slope of 10 degrees is shown.

While particular embodiments of this invention have been shown and described, it is not intended to limit the same to the exact details of the construction set forth, and it embraces such changes, modifications, and equivalents of the parts and their formation and arrangement as come within the purview of the appended claims.

What is claimed is:

1. A tank construction for bulk materials, comprising: a pair of cylindrical tank subsections joined together in end-to-end relationship, said subsections diverging upwardly in obtuse angular relation and closed at their distal ends to form a tank structure having a concave upper side; a beam fixed along its length to said tank subsections and bridging and reinforcing said upper side; support means at the extremities of said tank structure; and discharge means at the center of the underside of said tank structure, said discharge means including a tube extending laterally through the tank structure and having a downturned inlet end.

2. A tank construction for bulk materials, comprising: a pair of cylindrical tank subsections joined together in end-to-end relationship, said subsections diverging upwardly in obtuse angular relation and closed at their distal ends to form a tank structure having a concave upper side; a beam fixed along its length to said tank subsections and bridging and reinforcing said upper side; support means at the extremities of said tank structure; discharge means for fluidized material at the center of the underside of said tank structure, said discharge means including a tube extending laterally through the tank structure and having a downturned inlet and; a slide conveyor disposed along the bottom side of each subsection for delivering fluidized material to said discharge means; and downwardly converging partition walls along opposite sides of said slide conveyors.

3. A tank construction as set forth in claim 2, wherein: a dividing partition is interposed between said subsections, and said discharge means includes a pair of laterally directed tubes extending through the tank structure and having a downturned inlet end on opposite sides of said dividing partition.

4. A tank construction for bulk materials, comprising: a pair of cylindrical tank subsections joined together in end-to-end relationship, said subsections diverging upwardly in obtuse angular relation and closed at their distal ends to form a tank structure having a concave upper side; a beam fixed along its length to said tank subsections and bridging and reinforcing said upper side; support means at the extremities of said tank structure; a porous membrane extending along the inclined lower side of each subsection, and defining thereunder a shallow plenum chamber; downwardly converging partition walls along opposite sides of said porous membrane, their confronting sides forming means for guiding bulk material onto said porous membrane and their other sides defining with said subsections air ducts communicating with said plenum chamber for supply of air under said porous membrane, to fluidize said bulk material and cause said material to flow thereon; and discharge means for fluidized material at the lower extremity of said porous membrane having a downturned intake end to receive said fluidized material therefrom.

5. A tank construction as set forth in claim 4, wherein: said discharge means is common to both of said porous membranes.

6. A tank construction as set forth in claim 4, wherein: a dividing partition is interposed between said subsections and a pair of said discharge means are disposed on opposite sides of said dividing partition.

7. A tank construction for bulk materials, comprising: a pair of inclined cylindrical tank subsections sloping downwardly toward each other and joined at their lower ends and closed at their distal ends to form a tank structure; a longitudinally extending beam joined to the upper sides of said subsections, said beam increasing in depth toward its central portion; downwardly converging partition walls within said subsections for directing the contents thereof toward the lower sides of said subsections; conveyor means disposed between said partitions along the lower sides of said subsections; and discharge means therefor at the joined ends of said subsections, said discharge means including a tube extending laterally through the tank structure and having a downturned inlet end.

8. A tank construction as set forth in claim 7, wherein: said discharge means is common to said conveyor means.

9. A tank construction as set forth in claim 7, wherein: a transverse partition separates said subsections and a pair of discharge means is provided at opposite sides of said partition.

References Cited by the Examiner

UNITED STATES PATENTS

| | | | |
|---|---|---|---|
| 2,033,457 | 3/36 | Davis. | |
| 2,681,748 | 6/54 | Weller | 222—195 |
| 2,850,329 | 9/58 | Pyle et al. | 302—53 |
| 2,891,817 | 6/59 | Loomis | 302—52 |
| 3,009,607 | 11/61 | Sayre | 222—195 |
| 3,080,173 | 3/63 | Johnson et al. | 280—5 |

FOREIGN PATENTS

| | | |
|---|---|---|
| 671,667 | 5/52 | Great Britain. |

LOUIS J. DEMBO, *Primary Examiner.*